United States Patent [19]

Kujas

[11] 4,430,398
[45] Feb. 7, 1984

[54] SEPARATOR MATERIAL FOR ALKALINE STORAGE CELLS

[75] Inventor: Erich F. Kujas, Vincentown, N.J.

[73] Assignee: RCA Corporation, New York, N.Y.

[21] Appl. No.: 374,696

[22] Filed: May 4, 1982

[51] Int. Cl.³ .............................................. H01M 2/14
[52] U.S. Cl. .................................. 429/206; 429/248; 204/168
[58] Field of Search ............... 429/206, 248, 249, 222, 429/223; 204/168, 164, 165

[56] References Cited

U.S. PATENT DOCUMENTS

| | | | |
|---|---|---|---|
| 3,914,521 | 10/1975 | Beatty et al. | 204/168 X |
| 4,253,896 | 3/1981 | Appleyard et al. | 204/168 X |
| 4,297,187 | 10/1981 | Deguchi et al. | 204/168 X |

*Primary Examiner*—Anthony Skapars
*Attorney, Agent, or Firm*—Birgit E. Morris; R. Hain Swope

[57] ABSTRACT

A process for preparing separators for use in alkaline power cells for space vehicles is decribed. The separator is prepared by subjecting a sheet of fibrous polypropylene to corona discharge followed by impregnation with a compound selected from the group consisting of phenylglycine, parahydroxyphenylglycine and mixtures thereof.

9 Claims, 1 Drawing Figure

U.S. Patent
Feb. 7, 1984
4,430,398
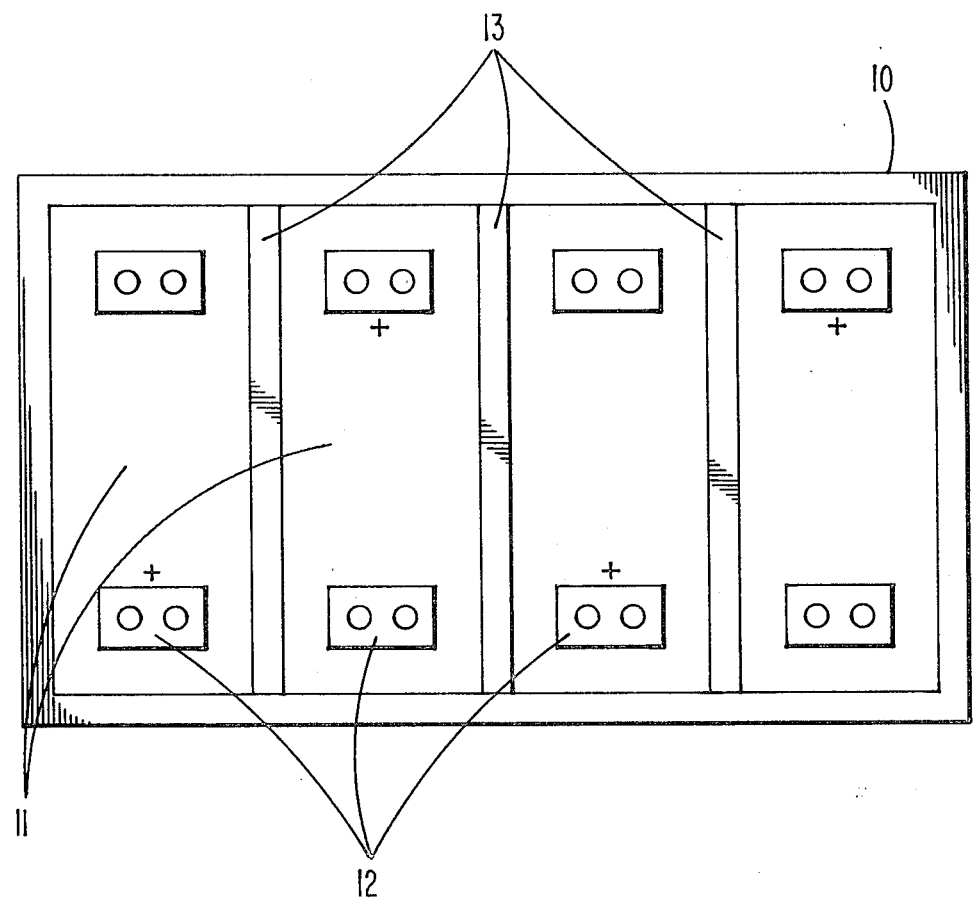

SEPARATOR MATERIAL FOR ALKALINE STORAGE CELLS

This invention pertains to power cells of the type utilized in space vehicles.

BACKGROUND OF THE INVENTION

Experience has shown that in close to one hundred percent of the instances where data is available, the initial failure in satellites or similar vehicles has been in the power cells. This is so for a number of reasons.

First, the power cells, or alkaline storage cells, are the one "system" in a space vehicle which really has no back-up replacement in the event of a failure. Also, obviously, a power source cannot be engineered around as is possible with many other components of a satellite or space vehicle.

More important, however, is that the conditions in space under which a power cell must function are especially rigorous. In a typical orbit, the space craft is shielded from the sun for part of the time and must rely on its batteries for power. When the craft is in direct sunlight, it is powered by solar cells which also recharge the batteries. The time intervals involved will depend on the orbit, the speed of the craft and other factors. Further, the demands on the power cell will also vary with the equipment on board, whether the power drain is steady or sporadic, etc.

The predominant cause of power cell failure is the separators within the cells. The separators break down both chemically and mechanically. As this occurs, the degree of polarization in the cell is gradually increased which results in loss of all potential. Eventually, the cells cannot meet power requirements and the space craft loses its usefulness and operation objectives.

There are three factors which electrically affect the separators in power cells. These factors, which operate more-or-less synergistically, are the extent of the charge, the rate of charge or discharge, and the number of life cycles, i.e. charge/discharge cycles. For example, it is not uncommon in space to charge power cells to 120–130 percent of their normal capacity. It is also not uncommon to rapidly take a huge amount of power out of a power cell and then not use it for from 24 to 48 hours. Frequently, power cells in space are on a continuous slow or trickle charge which is preferable to rapid charging just as gradual discharge is preferable to a large rapid outflow of power.

The most damaging of these factors affecting separators in power cells is the number of life cycles, particularly where the discharge and/or the recharge are rapid as opposed to gradual. Other factors notwithstanding, the number of life cycles determines the life of a battery. It will be readily appreciated that the life cycle capacity of a battery utilized in space vehicles can have an economic impact in the millions of dollars.

The remaining factor which materially affects the useful life of a power cell in space is the rapid, acute temperature changes as the vehicle passes in and out of direct sunlight. While it is commonplace to provide heating means on power cells in space craft to somewhat negate cold temperatures, little can be done about the heat other than insulation of various forms. Heat, therefore, is a damaging factor to be considered in the development of new battery materials. In accordance with this invention, there is provided a separator material for power cells which is clearly superior to presently used materials in terms of its resistance to the above-identified degrading factors.

SUMMARY OF THE INVENTION

In accordance with this invention, there is provided a material suitable for separators for alkaline power cells in space vehicles. The subject material comprises polypropylene which is treated first with a corona discharge and then impregnated with phenylglycine or parahydroxyphenylglycine.

BRIEF DESCRIPTION OF THE DRAWING

The FIGURE is a schematic top view of a typical nickel-cadmium power cell.

DETAILED DESCRIPTION OF THE INVENTION

Of the various types of alkaline power or storage cells available to the aerospace industry for use in space, nickel-cadmium cells are the most widely used. Conventionally, such power cells contain separators made of a non-woven, 100 percent polyamide nylon known as Nylon 6. This material has been chosen by most manufacturers of batteries for space usage after extensive testing with other materials such as polyethylene terephthalate, polytetrafluoroethylene, and the like. Nylon 6 was chosen because it has good mechanical properties and an internal resistance drop which was as good as or better than any other material tested. Nylon 6, however, is susceptible to both chemical and mechanical degradation. A method of treating polypropylene is provided in accordance with this invention which renders it clearly superior to Nylon 6 as a separator for sealed nickel/cadmium power cells.

It is essential that the polypropylene utilized to prepare the novel separators of this invention be in fibrous form, as contrasted with, e.g., molded or extruded forms. The fibrous form is necessary so that impregnation can be uniform throughout the separator as described hereinafter. The fibers of the polypropylene may be in a knitted or woven configuration, as well as a nonwoven, i.e. random orientation, with the latter being preferred. It is essential that the polypropylene have a flat surface. Although the thickness of sheets of fibrous polypropylene treated in accordance with this invention is not particularly critical, it is preferred that they be between about 10 mils and 15 mils thick.

The first step in the treatment of sheets of fibrous polypropylene in accordance with this invention is to subject them to corona discharge to create surface porosity. The purpose of this is two-fold, i.e. to render the surface of the polypropylene sheet wettable, and to permit the passage of the impregnating solution into the interior of the sheet so that it may fill the interstices between the fibers to the greatest degree possible.

It is necessary for a separator in a nickel/cadmium battery to retain the alkaline electrolyte in each cell on its surface in order to function. Most batteries of this type utilize sodium hydroxide or, preferably, potassium hydroxide as the electrolyte. Polypropylene, although very resistant to oxidation in such a harsh alkaline environment, will not wet sufficiently to function as a separator since failure to uniformly disperse the electrolyte on the separator surface results in poor power output. Corona discharge in accordance with this invention causes the fibrous polypropylene sheets to wet effectively without detracting from any of their properties which are desirable for use as a separator.

A typical nickel/cadmium battery is shown schematically in the FIGURE. In the FIGURE, the battery casing 10 contains four individual cells 11 each of which contains a pair of electrodes 12. Between each pair of cells is a separator 13.

The corona discharge treatment in accordance with this invention is carried out in conventional equipment at ambient temperature and with air as the atmosphere. The voltage is from about 100 to about 250 volts, with 200 volts being preferred, with a current flow of from about 10 to about 20 amperes, with 15 amperes being preferred. The polypropylene is subjected to the corona discharge for from about one to about five seconds, with two seconds being preferred.

The second step in the treatment of fibrous sheets of polypropylene in accordance with this invention is impregnation with a substance selected from the group consisting of phenylglycine, parahydroxyphenylglycine and mixtures thereof. Once these compounds penetrate the interstices of the filaments of the polypropylene fibers, they are retained with a very strong mechanical bond, the exact nature of which is unknown. These compounds function in several ways to prolong the useful life of the separator.

Phenylglycine and parahydroxyphenylglycine, impregnated into the interstices of the fibrous polypropylene sheets according to this invention keeps harsh alkali, such as potassium hydroxide, on the surface so that it cannot penetrate into the interior of the sheet and degrade the fibers. These substances also protect the fibers from attack by metallic particles, particularly cadmium, which break away from the electrodes. Most important, these substances have excellent thermal characteristics and their presence in the separator significantly improves the thermal characteristics of the polypropylene and makes the separator more resistant to degradation by heat.

Phenylglycine, parahydroxyphenylglycine and mixtures thereof are impregnated into the fibrous polypropylene sheets in accordance with this invention in aqueous solution. The solution contains from about 25 to about 50 percent by weight, preferably about 40 percent by weight, of the impregnate compound. Where mixtures of phenylglycine and parahydroxyphenylglycine are utilized, they can be in any proportion, with equal quantities by weight being preferred. Impregnation is carried out simply by immersing the polypropylene sheet in the aqueous solution at ambient or slightly elevated temperature, e.g. at about 80° F. For fibrous polypropylene sheets of conventional thickness, i.e. 10 mils to 15 mils, immersion for one to two minutes is sufficient. Thicker sheets may require up to about five minutes immersion.

The impregnation of fibrous polypropylene sheets according to this invention results in from about 6 to about 20 percent, preferably about 12 percent, fill of the pore volume of the sheets. This represents a weight gain of between about 2 and about 10 percent by weight, preferably about 3.5 percent by weight, based on the weight of the polypropylene. After the sheets are removed from the impregnating solution, they are compressed in suitable equipment e.g. in a conventional padder, at about from about 60 to about 80 p.s.i, preferably about 65 p.s.i., to remove excess solution. The sheets are then dried at from about 100° F. to about 120° F., preferably at about 100° F., for from about 16 to about 24 hours, preferably about 16 hours. Significantly increasing or decreasing the pressure in the padder will have a corresponding effect on the amount of impregnating solution retained in the sheet. It will be appreciated that the impregnation is not effective unless the sheet has been previously subjected to corona discharge. After drying, the subject separators are ready to be incorporated into alkaline power cells.

The following Example further illustrates this invention, it being understood that the invention is in no way intended to be limited to the details described therein.

EXAMPLE

Sheets of fibrous polypropylene 36"×36", random fiber orientation, 6 oz./sq. yd., 4 denier fibers, were treated as follows. The sheets were passed through a corona discharge field under ambient atmosphere and temperature. The current was 15 amperes and the voltage was 200 volts. Passage through the field required about 2 seconds.

The sheets were then immersed in a 40 percent by weight aqueous solution of phenylglycine at 80° F. for two minutes. The sheets were removed from the solution, allowed to drain for a few moments, and passed through a conventional padding machine under a pressure of about 60 p.s.i. The sheets were then placed in an oven and dried at 100° F. for 16 hours. The sheets were then weighed and it was determined that the average weight gain due to impregnation with phenylglycine was about 3.5 percent by weight.

The sheets treated as above were incorporated into nickel/cadmium batteries of the type used aboard satellites. Two such batteries were compared at 25° C. with similar batteries containing conventional Nylon 6 separators. Each battery had a capacity of 6 ampere-hours and contained eight separators. The batteries were continuously charged and discharged at 100 percent of capacity. The conventional batteries failed at about 18,000 cycles. This represents about 10 years of normal use at 25° C. The batteries containing the separators of this invention were both functioning well at 32,000 cycles.

I claim:
1. A process of preparing a separator for an alkaline power cell comprising:
   (a) treating sheets of fibrous polypropylene to create surface porosity by passing them through a corona discharge; and
   (b) impregnating the sheets with a glycine selected from the group consisting of phenylglycine, parahydroxyphenylglycine and mixtures thereof.
2. A process in accordance with claim 1, wherein said sheets are impregnated by immersion into an aqueous solution of said substance, said process including the steps of compressing the sheets to remove excess solution and then drying to remove the solvent.
3. A process in accordance with claim 2, wherein said solution contains from about 25 to about 50 percent by weight of said glycine.
4. A process in accordance with claim 3, wherein said solution contains about 40 percent by weight of said glycine.
5. A process in accordance with claim 1, wherein said glycine is phenylglycine.
6. A process in accordance with claim 1, wherein said glycine is parahydroxyphenylglycine.
7. As an article of manufacture, a sheet of fibrous polypropylene treated in accordance with the process of claim 1.
8. An alkaline power cell containing at least one separator consisting of a sheet of fibrous polypropylene treated in accordance with the process of claim 1.
9. A power cell in accordance with claim 8, wherein said power cell is a nickel/cadmium cell.

* * * * *